Patented Oct. 16, 1923.

1,470,674

UNITED STATES PATENT OFFICE.

JOSEPH HAY AMIES, OF PHILADELPHIA, PENNSYLVANIA.

METHOD OF PREPARING A CEMENTITIOUS COMPOSITION.

No Drawing. Application filed March 30, 1921. Serial No. 457,099.

*To all whom it may concern:*

Be it known that I, JOSEPH HAY AMIES, a citizen of the United States, residing at the city of Philadelphia, county of Philadelphia, and State of Pennsylvania, have invented a certain new and useful Method of Preparing a Cementitious Composition, of which the following is a specification.

The leading object of the present invention may be said to reside in the providing of a cementitious composition which readily sets and hardens so that the various utilities to which it is applied, commercially speaking, may be used simultaneously with construction thereof. With this and other objects in view, the invention consists of the method hereinafter described and finally claimed.

In the practice of the invention, the cementitious composition is usually prepared in a standard concrete mixing machine, although obviously the composition may be otherwise mixed. For the sake of illustration the following description will be restricted to the preparation of the composition in a mixing machine.

According to the present method I first take sodium carbonate and dissolve it in water and place the same within the mixing machine. To this I add either earthy material that is water moistened or earthy material in a granulated condition. Finally I add sodium silicate in a condition readily soluble in water. Good results have been obtained by employing four parts more or less of soil, one part more or less of sodium silicate and one fifth part more or less of sodium carbonate.

No particular kind of earthy material is necessary and soil as found at the place where the cementitious composition is employed may be utilized. Ashes and cinders mixed or unmixed with loams or clays, clean or unclean, where found in large or convenient quantities may be utilized. The earthy material may consist of clays and loams associated with granular matter insoluble in water, such as fine sand, coarse gravel, pebbles and cobbles or it may be earthy materials free of such granular matter. In any event the earthy materials may contain more or less of acids.

I have found that the alkaline solution formed by the sodium carbonate and water serves to neutralize said acids. I have also found that the sodium silicate absorbs the sodium carbonate, thereby permitting the sodium silicate to much more rapidly mix with and harden the earthy materials, after being expelled from the mixer. This intimate mix and rapid hardening permits the finished composition to accept immediate compression. Such intimate mix and rapid hardening precedes the crystallization of the sodium silicate. If it be desired, further, to prepare the composition to provide great resistance after the application of powerful compression, I take one or more parts of gravel, pebbles or the like, mix them with one or more parts of the sodium silicate and dampen this mixture with water to form a stiff mortar. This stiff mortar, is then added to the mass above described, within the the mixer. The finished composition, as it then comes from the mixer, should be in a semi-dry condition and in a state to receive immediate compression. In forming various articles it is essential that the resultant mass should be placed in this semi-dry condition prior to the application of compression. If this semi-dry condition is not secured, the surfaces of the artcles, being formed, present very hard, glassy and highly crystallized encasements. Such encasements permanently and hermetically seal the internal moisture within the articles being formed, thus causing permanent internal weakness. To obviate this, the resultant mass may be subjected to any preferred method of drying, prior to the application of heavy compression, which, may then be immediately applied thereto, thus securing a uniform crystallization, of said articles, throughout their entire body.

I have found that by dissolving the sodium carbonate in water and placing the same in the mixer prior to the addition of the earthy material and sodium silicate, that better results may be obtained, than by mixing the sodium carbonate with the sodium silicate, before associating them with the earthy material. However, the sodium carbonate, in granulated or powdered form, may be thrown into a mixer containing water and then the earthy material and sodium silicate added thereto. I do not however consider this the best method, although it does to some degree prevent the adhesion of the mass to the inner surfaces of the mixer.

What I claim is:

1. The method of preparing a cementitious composition which consists in taking common earth in comminuted form and mixing same in a solution composed of sodium carbonate and water and then mixing therewith sodium silicate.

2. The method of preparing a cementitious composition which consists in dissolving sodium carbonate in water to form a solution, then mixing therein common earth in comminuted condition and then mixing therewith sodium silicate readily soluble in water.

3. The method of preparing a cementitious composition which consists in taking substantially four parts of comminuted common earth and mixing the same in a solution composed of water and substantially one-fifth part of sodium carbonate and then mixing therewith substantially one part of sodium silicate.

4. The method of preparing a cementitious composition which consists in taking comminuted common earth, mixing the same in a solution composed of sodium carbonate and water, mixing therewith sodium silicate, and then drying the resultant mass to a degree that will enable it to accept immediate and heavy compression whereby uniform crystallization may be secured for articles to be formed of said mass interiorly and exteriorly considered.

5. The method of forming a cementitious article which consists in taking comminuted common earth, mixing the same in a solution composed of sodium carbonate and water, mixing therewith sodium silicate, drying the resultant mass and immediately subjecting the dryed mass to compression whereby uniform crystallization is secured for said article interiorly and exteriorly considered.

6. The method of preparing a cementitious composition which consists in taking common earth which is water moistened and mixing same in a solution composed of sodium carbonate and water and then mixing therewith sodium silicate.

7. The method of preparing a cementitious composition which consists in dissolving sodium carbonate in water to form a solution, then mixing therein common earth in a water moistened state and then mixing therewith sodium silicate readily soluble in water.

8. The method of preparing a cementitious composition which consists in taking substantially four parts of common earth which is water moistened and mixing the same in a solution composed of water and substantially one-fifth part of sodium carbonate and then mixing therewith substantially one part of sodium silicate.

9. The method of preparing a cementitious composition which consists in taking common earth which is water moistened mixing the same in a solution composed of sodium carbonate and water, mixing therewith sodium silicate and then drying the resultant mass to a degree that will enable it to accept immediate and heavy compression whereby uniform crystallization may be secured for articles to be formed by said mass interiorly and exteriorly considered.

10. The method of forming a cementitious article which consists in taking common earth which is water moistened, mixing the same in a solution composed of sodium carbonate and water, mixing therewith sodium silicate drying the resultant mass and immediately subjecting the dryed mass to compression whereby uniform crystallization is secured for said article interiorly and exteriorly considered.

In witness whereof I have hereunto signed my name.

JOSEPH HAY AMIES.